(12) United States Patent
Naganuma et al.

(10) Patent No.: US 12,175,513 B2
(45) Date of Patent: Dec. 24, 2024

(54) INFORMATION PROCESSING DEVICE AND VEHICLE MANUFACTURING METHOD

(71) Applicant: TOYOTA JIDOSHA KABUSHIKI KAISHA, Toyota (JP)

(72) Inventors: Yuki Naganuma, Nagoya (JP); Junya Ogawa, Okazaki (JP); Junya Yamamoto, Seto (JP); Nozomi Toya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 17/737,168

(22) Filed: May 5, 2022

(65) Prior Publication Data

US 2022/0383375 A1    Dec. 1, 2022

(30) Foreign Application Priority Data

May 26, 2021    (JP) ................................. 2021-088771

(51) Int. Cl.
*G06Q 30/0601* (2023.01)
*B05D 5/06* (2006.01)
*B05D 7/00* (2006.01)

(52) U.S. Cl.
CPC ......... *G06Q 30/0621* (2013.01); *B05D 5/061* (2013.01); *B05D 7/57* (2013.01)

(58) Field of Classification Search
CPC ....... B05D 5/061; B05D 7/57; G06Q 30/0621
See application file for complete search history.

(56) References Cited

U.S. PATENT DOCUMENTS

| | | | |
|---|---|---|---|
| 2002/0072958 A1 | 6/2002 | Yuyama et al. | |
| 2002/0077377 A1 | 6/2002 | Zhang et al. | |
| 2003/0120369 A1 | 6/2003 | Takaoka et al. | |
| 2006/0134333 A1* | 6/2006 | Nagase | B05D 7/578 |
| | | | 427/299 |
| 2010/0239752 A1* | 9/2010 | Serizawa | B44D 3/003 |
| | | | 427/140 |
| 2020/0126259 A1* | 4/2020 | Accessor | G06F 16/29 |

FOREIGN PATENT DOCUMENTS

| | | |
|---|---|---|
| EP | 2150594 A1 | 2/2010 |
| JP | 02-084468 A | 3/1990 |
| JP | 060254488 A | 9/1994 |
| JP | 08-058271 A | 3/1996 |
| JP | 09-251486 A | 9/1997 |
| JP | 11-066119 A | 3/1999 |
| JP | 2002-140462 A | 5/2002 |
| JP | 2002-297954 A | 10/2002 |
| JP | 2014-511514 A | 5/2014 |
| KR | 10-2126451 B1 | 6/2020 |
| WO | 2008/148763 A1 | 12/2008 |
| WO | 2012/094296 A2 | 7/2012 |

\* cited by examiner

*Primary Examiner* — Michael P Wieczorek
(74) *Attorney, Agent, or Firm* — Sughrue Mion, PLLC

(57) ABSTRACT

An information processing device that decides a specification of a vehicle used by a user includes a controller configured to execute deciding a first paint color that is a color of painting of the vehicle, and receiving a designation of a second paint color that is a color of painting to be overcoated on at least a portion of the painting with the first paint color. The painting with the second paint color includes an easily peelable layer.

15 Claims, 13 Drawing Sheets

FIG. 3

SPECIFICATION DATA

| ORDER ID | USER ID | VEHICLE MODEL ID | GRADE ID | FIRST BODY COLOR ID | SECOND BODY COLOR ID | OPTION | ⋮ |
|---|---|---|---|---|---|---|---|
| ⋮ | U001 | V001 | X | C001 | C011 | ⋮ | ⋮ |
| ⋮ | U002 | V002 | X | C001 | C012 | ⋮ | ⋮ |
| ⋮ | U003 | V003 | G | C002 | C013 | ⋮ | ⋮ |
| ⋮ | ⋮ | ⋮ | ⋮ | ⋮ | ⋮ | ⋮ | ⋮ |

FIG. 4

RESIDUAL VALUE DATA

| VEHICLE MODEL ID | GRADE ID | FIRST BODY COLOR ID | SETTING DATE | SETTING RESIDUAL VALUE |
|---|---|---|---|---|
| V001 | ... | C001 | JANUARY 2024 TO MARCH 2024 | 1,500,000 YEN |
| V001 | ... | C001 | ... | ... |
| V001 | ... | C001 | ... | ... |
| V001 | ... | C002 | ... | ... |
| V001 | ... | C002 | ... | ... |
| V001 | ... | C003 | ... | ... |
| V001 | ... | C003 | ... | ... |
| V001 | ... | C004 | ... | ... |
| ... | ... | ... | ... | ... |

FIG. 5

ORDER-RELATED DATA

| VEHICLE MODEL ID | GRADE ID | FIRST BODY COLOR ID | DELIVERY DATE A | DELIVERY DATE B | VEHICLE MANUFACTURING BASE |
|---|---|---|---|---|---|
| V001 | ... | C001 | IMMEDIATE DELIVERY | TWO WEEKS | A FACILITY |
| V002 | ... | C002 | EIGHT WEEKS | 10 WEEKS | B FACILITY |
| ... | ... | ... | ... | ... | ... |

FIG. 10B

APPRAISED VALUE OF
VEHICLE WHEN OVERCOATING IS REMOVED
AFTER THREE YEARS AND BODY COLOR OF
VEHICLE IS RESTORED TO ORIGINAL COLOR

VEHICLE MODEL XXXX

| ORIGINAL COLOR | SETTING RESIDUAL VALUE |
| --- | --- |
| WHITE PEARL | 1,620,000 YEN |
| SILVER METALLIC | 1,550,000 YEN |
| SENSUAL RED | 1,480,000 YEN |
| DARK BLUE | 1,510,000 YEN |
| GRAY METALLIC | 1,560,000 YEN |
| BLACK MICA | 1,590,000 YEN |

NEXT

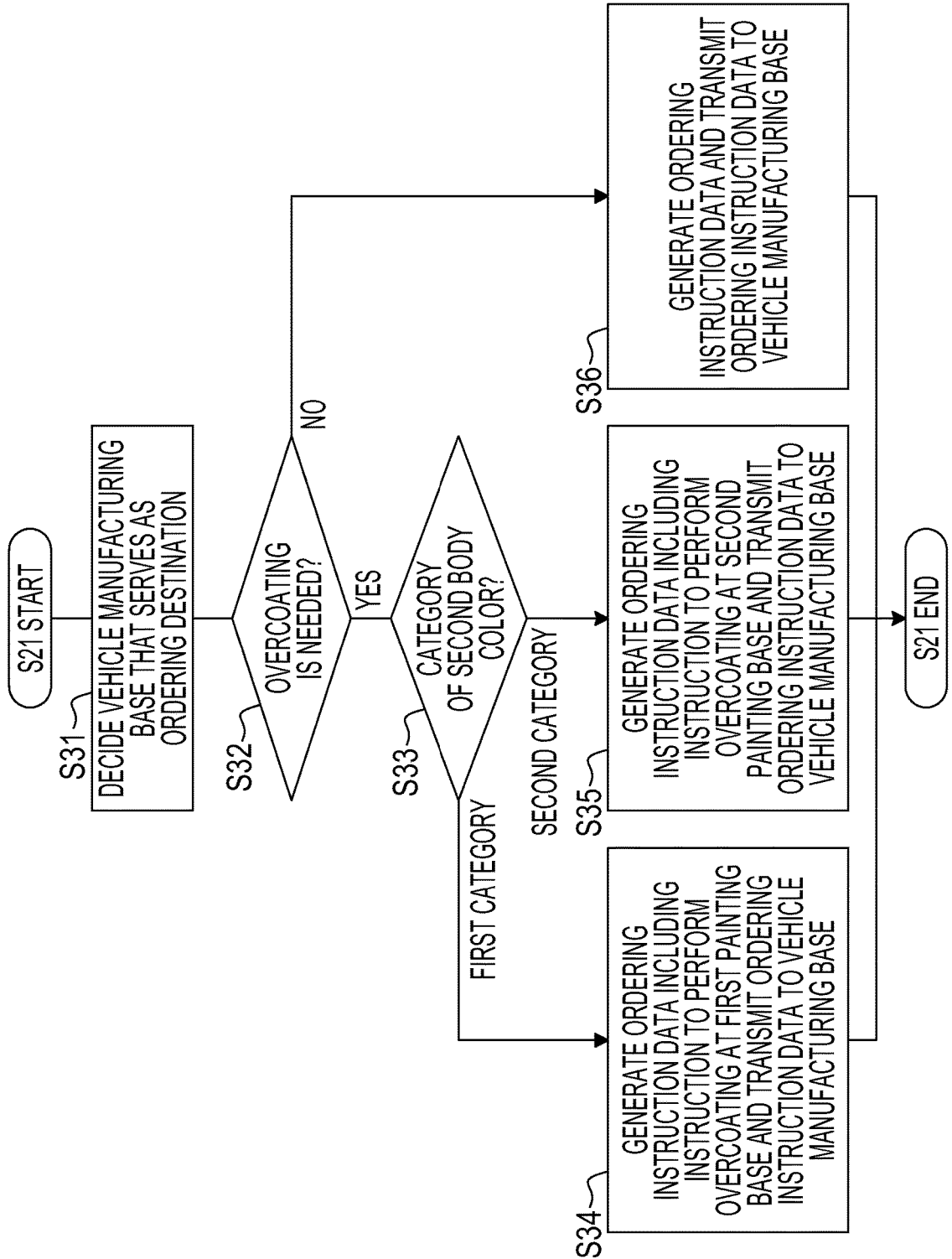

FIG. 13

HISTORY DATA

| USER ID | VEHICLE MODEL ID | GRADE ID | FIRST BODY COLOR ID | SECOND BODY COLOR ID | TYPE | USE START DATE | USE END DATE |
|---|---|---|---|---|---|---|---|
| U001 | V001 | ... | C001 | C011 | LEASE | 4/1/2015 | 3/31/2019 |
| U001 | V002 | ... | C002 | C012 | BUY-OUT | 4/15/2019 | - |
| ... | ... | ... | ... | ... | ... | ... | ... |

INFORMATION PROCESSING DEVICE AND VEHICLE MANUFACTURING METHOD

CROSS-REFERENCE TO RELATED APPLICATION

This application claims priority to Japanese Patent Application No. 2021-088771 filed on May 26, 2021, incorporated herein by reference in its entirety.

BACKGROUND

1. Technical Field

The present disclosure relates to an information processing device that decides a specification of a vehicle used by a user, and a vehicle manufacturing method.

2. Description of Related Art

It is known that an appraised value of a used automobile for sale varies depending on a degree of deterioration of painting. As a related art, for example, Japanese Unexamined Patent Application Publication No. 06-254488 (JP 06-254488 A) discloses a technique related to a protective film that protects a coating film of a body of an automobile.

SUMMARY

The present disclosure provides an information processing device that decides a specification of a vehicle used by a user, and a vehicle manufacturing method.

A first aspect of the present disclosure relates to an information processing device that decides a specification of a vehicle used by a user. The information processing device includes a controller configured to execute deciding a first paint color that is a color of painting of the vehicle, and receiving a designation of a second paint color that is a color of painting to be overcoated on at least a portion of the painting with the first paint color. The painting with the second paint color includes an easily peelable layer.

In the first aspect of the present disclosure, the controller may be configured to further execute receiving a designation of the first paint color, and to execute deciding the first paint color according to the designation.

In the first aspect of the present disclosure, the first paint color may be selected from a first category, and the second paint color may be selected from a second category including more color variations than the first category.

In the first aspect of the present disclosure, the controller may be configured to acquire an expected number of years of use of the vehicle by the user, and to receive the designation of the second paint color when the expected number of years of use is equal to or less than a predetermined value.

In the first aspect of the present disclosure, the controller may be configured to acquire an expected number of years of use of the vehicle by the user, and to receive the designation of the second paint color when the expected number of years of use exceeds a predetermined value and the user agrees with a matter relating to a useful life of the painting including the easily peelable layer.

In the first aspect of the present disclosure, the controller may be configured to notify the user of a timing when the useful life of the painting including the easily peelable layer is ended.

In the first aspect of the present disclosure, the controller may be configured to acquire the expected number of years of use based on a history of a vehicle used by the user in past.

In the first aspect of the present disclosure, the controller may be configured to acquire the expected number of years of use based on at least one of a history of a vehicle owned by the user in past or a period of a vehicle lease contract concluded by the user in past.

In the first aspect of the present disclosure, the controller may be configured to acquire, based on at least one of the first paint color or the second paint color, a predicted appraised value of the vehicle after a predetermined period elapses.

In the first aspect of the present disclosure, the controller may be configured to acquire, based on the first paint color, a predicted appraised value of the vehicle when the painting including the easily peelable layer is peeled off after a predetermined period elapses.

In the first aspect of the present disclosure, the controller may be configured to output the predicted appraised value for each first paint color and to receive the designation of the first paint color.

In the first aspect of the present disclosure, the controller may be configured to decide, as the first paint color, a paint color of the vehicle of which the predicted appraised value is higher than a predetermined appraised value.

In the first aspect of the present disclosure, the painting with the first paint color may be painting including a pearl layer or a pearl mica layer.

In the first aspect of the present disclosure, the painting with the first paint color may be painting including a coating film including four or more layers.

In the first aspect of the present disclosure, the controller may be configured to order the vehicle of which the first paint color is indicated on a caution plate.

In the first aspect of the present disclosure, a subject that determines a standard for deciding the first paint color may be different from a subject that designates the second paint color.

In the first aspect of the present disclosure, a range of the painting with the second paint color may be narrower than a range of the painting with the first paint color.

In the first aspect of the present disclosure, the painting with the second paint color may be applied to a portion exposed to an outside during traveling of the vehicle.

A second aspect of the present disclosure relates to a vehicle manufacturing method. The vehicle manufacturing method includes deciding a first paint color that is a color of painting of the vehicle, receiving a designation of a second paint color, and overcoating at least a portion of the painting with the first paint color of the vehicle, with painting including an easily peelable layer with the second paint color.

In the second aspect of the present disclosure, when the at least the portion of the painting with the first paint color of the vehicle is overcoated with the painting including the easily peelable layer with the second paint color, the painting with the second paint color may be applied to a portion exposed to an outside during traveling of the vehicle.

According to the present disclosure, it is possible to improve a value of a vehicle at the time of resale of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is an example of specification data generated by the contract server;

FIG. 4 is an example of residual value data stored in the contract server;

FIG. 5 is an example of order-related data stored in the contract server;

FIG. 10B is an example of a screen for guiding a residual value of a vehicle;

FIG. 11 is a flowchart of processing executed by the contract server in Step S21;

FIG. 13 is an example of history data in a second embodiment.

DETAILED DESCRIPTION OF EMBODIMENTS

Figure 1:
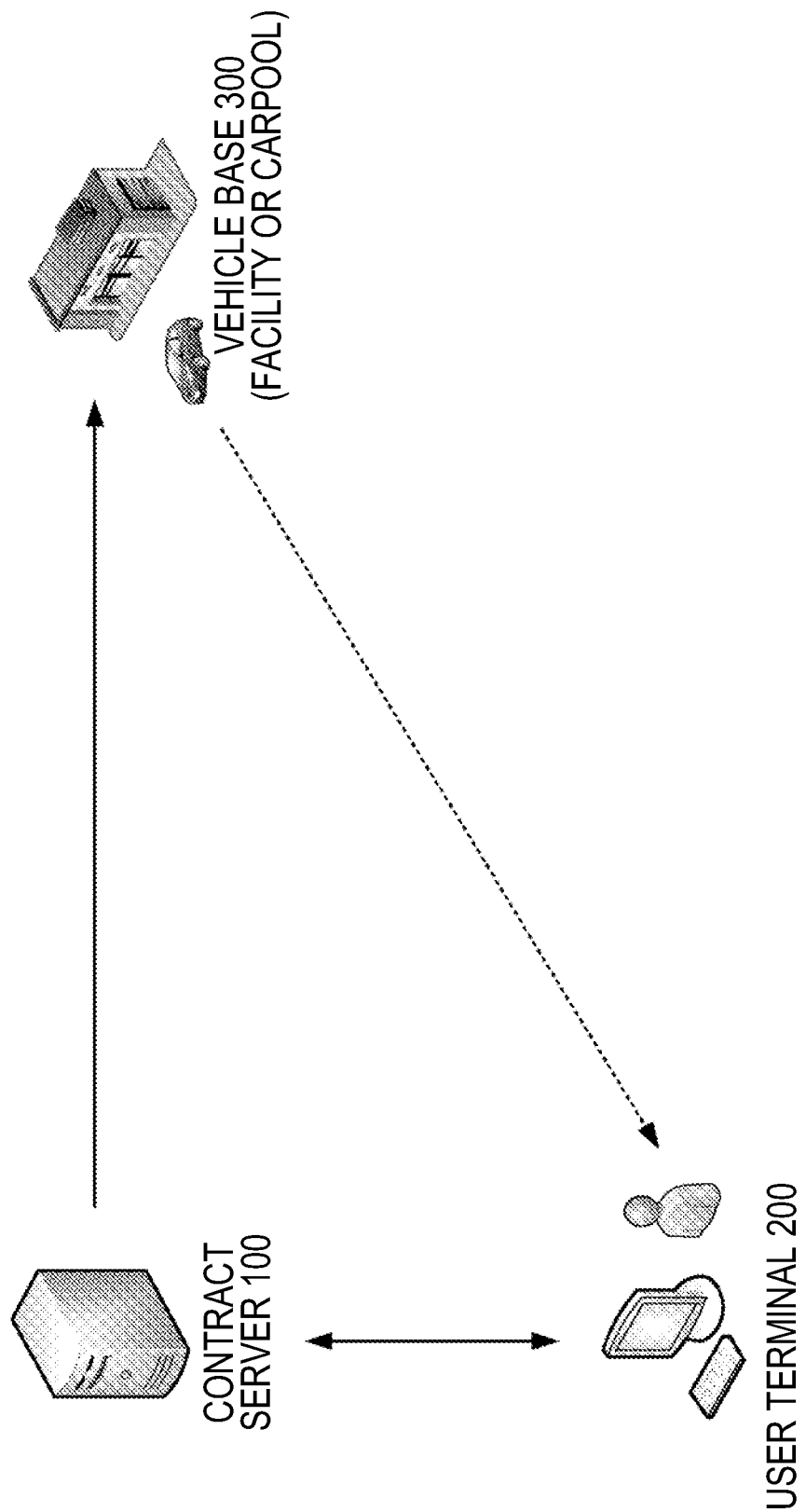
FIG. 1 is a diagram illustrating an outline of a vehicle ordering system.

It is known that an appraised value of an automobile sold as a used car varies depending on a body color of the automobile. For example, a vehicle having a color that is popular in a used car market may have a higher appraised value than a vehicle having a color that is not popular.

A body color desired by a user who purchases a vehicle is not necessarily a color that is highly evaluated in the used car market. That is, depending on the body color desired by the user, there is a difference in value of the vehicle at the time of sale of the vehicle.

An information processing device according to a first aspect of the present disclosure is an information processing device that decides the specifications of a vehicle used by a user. Specifically, the information processing device includes a controller configured to execute deciding a first paint color that is a color of painting of the vehicle, and receiving a designation of a second paint color that is a color of painting to be overcoated on at least a portion of the painting with the first paint color. The painting with the second paint color includes an easily peelable layer.

The easily peelable layer (or peelable layer) refers to a coating film layer that can be applied to a body and peeled off therefrom afterwards. The painting including the easily peelable layer may be, for example, a combination of a peelable film-like coating film and normal painting, or painting in which a paint layer itself can be peeled (easily peelable paint).

The vehicle is overcoated with the painting including the easily peelable layer, whereby the overcoated painting can be peeled off afterwards (that is, the body color can be restored to the original).

The easily peelable layer and the painting including the easily peelable layer may be peeled off more easily than the painting with the first paint color.

The information processing device according to the present disclosure may decide a combination of the first paint color and the second paint color when the information processing device decides the specifications of the vehicle. The first paint color may be decided by the information processing device. The first paint color may be decided by the information processing device according to the designation by the user who orders the vehicle. The combination of the colors may be decided based on an appraised value of the vehicle after a predetermined period of time elapses.

With the configuration as described above, it is possible to provide the vehicle with the color which matches the user's desire with a resale value of the vehicle kept.

The controller may be configured to further execute receiving a designation of the first paint color, and to execute deciding the first paint color according to the designation.

The first paint color may be selected from a first category, and the second paint color may be selected from a second category including more color variations than the first category. The painting with the first paint color may be painting including a pearl layer or a pearl mica layer. The painting with the first paint color may be painting including a coating film including four or more layers.

This is because, in general, body colors, such as white and black, and body colors having a coating film including many layers tend to have higher appraised values than other body colors.

The controller may be configured to acquire an expected number of years of use of the vehicle by the user, and to receive the designation of the second paint color when the expected number of years of use is equal to or less than a predetermined value.

This is because it is desired to apply the overcoating with the second paint color in consideration of a resale value of the vehicle when the expected number of years of use is equal to or less than the predetermined value (for example, when there is a plan to sell the vehicle in a short period of time).

The controller may be configured to acquire an expected number of years of use of the vehicle by the user, and to receive the designation of the second paint color when the expected number of years of use exceeds a predetermined value and the user agrees with a matter relating to a useful life of the painting including the easily peelable layer.

Since the painting including the easily peelable layer has a useful life, it is desired not to apply the overcoating when the expected number of years of use of the vehicle exceeds the predetermined value, while the designation of the second paint color may be received when the user desires the painting. In this case, the controller may be configured to notify the user of a timing when the useful life of the painting including the easily peelable layer is ended. The notification may be made immediately before the timing, or may be made when the specifications of the vehicle are decided.

The controller may be configured to acquire the expected number of years of use based on a history of a vehicle used by the user in the past.

The controller may be configured to acquire the expected number of years of use based on at least one of a history of a vehicle owned by the user in the past or a period of a vehicle lease contract concluded by the user in the past.

This is because a predicted number of years of use of a vehicle to be purchased can be estimated by referring to the history of the vehicle used by the corresponding user in the past.

The controller may be configured to acquire, based on at least one of the first paint color or the second paint color, a predicted appraised value of the vehicle after a predetermined period elapses.

The controller may be configured to acquire, based on the first paint color, a predicted appraised value of the vehicle when the painting including the easily peelable layer is peeled off after a predetermined period elapses.

When the painting including the easily peelable layer is peeled off, the vehicle is restored to the first paint color. Therefore, the predicted appraised value can be obtained based on the first paint color.

The controller may be configured to output the predicted appraised value for each first paint color and to receive the designation of the first paint color.

The controller may be configured to decide, as the first paint color, a paint color of the vehicle of which the predicted appraised value is higher than a predetermined appraised value.

With the configuration as described above, it is possible to decide the first paint color of the vehicle having a higher appraised value.

The controller may be configured to order the vehicle of which the first paint color is indicated on a caution plate.

The color indicated on the caution plate is a registered original paint color of the vehicle.

A subject that determines a standard for deciding the first paint color may be different from a subject that designates the second paint color.

For example, the standard for deciding the first paint color may be determined based on the intention of a person who has a plan to sell the vehicle in the future (for example, a leasing company that has ownership of the vehicle), and the second paint color may be designated by the user of the vehicle.

A range of the painting with the second paint color may be narrower than a range of the painting with the first paint color.

The painting with the second paint color may be applied to a portion exposed to an outside during traveling of the vehicle.

This is because, for example, there is no need to apply the overcoating with the second paint color to a portion that is not exposed to the outside during traveling, such as an inside of a door.

Hereinafter, specific embodiments of the present disclosure will be described based on the drawings. Unless otherwise specified, the hardware configuration, module configuration, functional configuration, and the like described in each embodiment are not intended to limit the technical scope of the disclosure.

First Embodiment

An outline of a vehicle ordering system according to a first embodiment will be described with reference to FIG. 1. The vehicle ordering system according to the present embodiment includes a contract server 100 and a user terminal 200.

The contract server 100 is a server device that makes conclusion of a sales contract of an automobile with a user.

The contract server 100 interacts with the user terminal 200 to decide the specifications of a vehicle to be sold to the user and to make conclusion of a sales contract of the vehicle.

The user terminal 200 is a computer used by a user who purchases a vehicle. The user can access the contract server 100 via the user terminal 200 and apply for a sales contract of the vehicle. Here, although it is assumed that the sales contract is made online, the sales contract may be made at a store (for example, a car dealer). In this case, the user terminal 200 may be a computer installed in the store.

Figure 2:
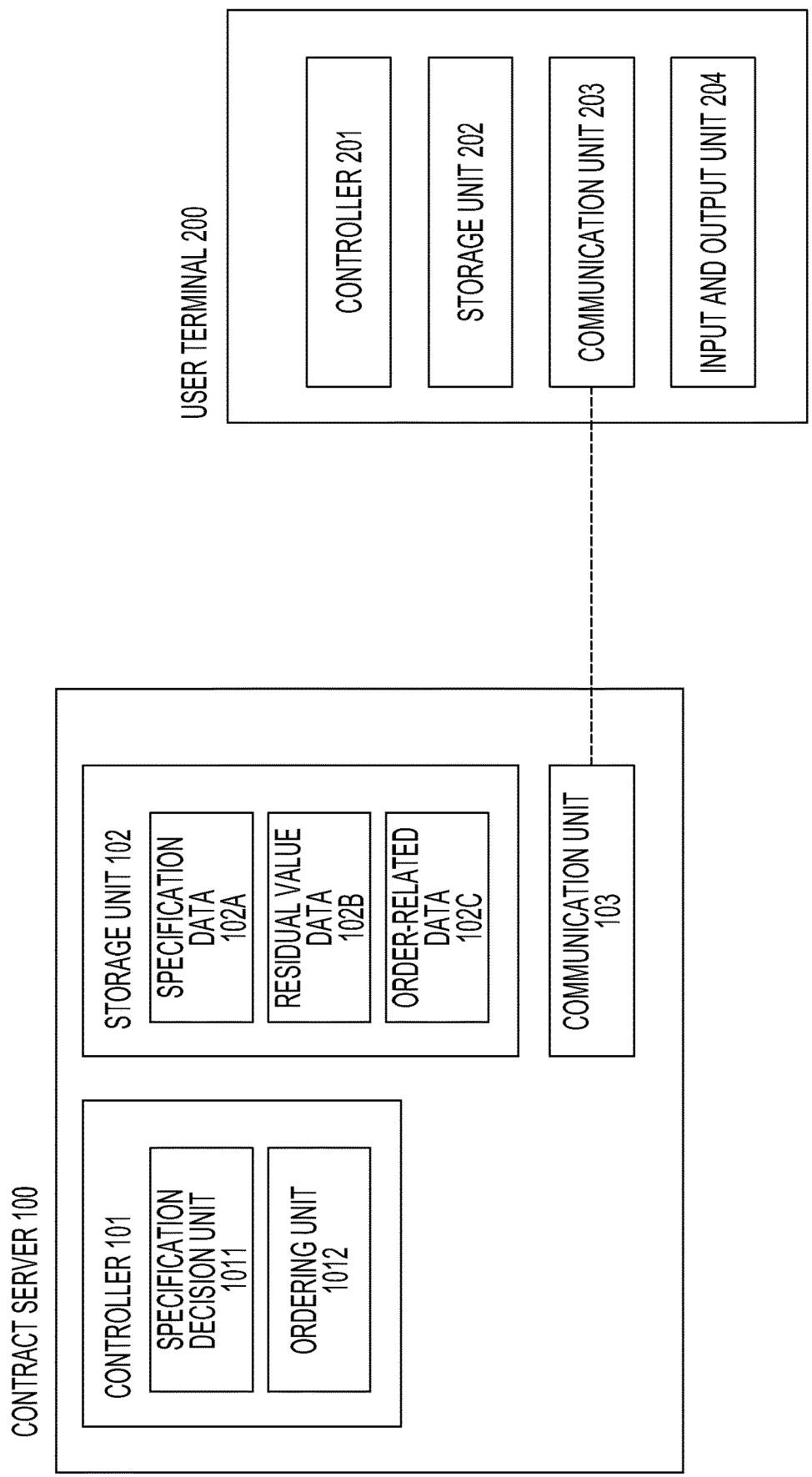
FIG. 2 is a diagram illustrating a configuration of a contract server and a user terminal.

FIG. 2 is a diagram showing in more detail the components of the contract server 100 and the user terminal 200 included in the vehicle ordering system according to the present embodiment. Here, first, the user terminal 200 will be described.

The user terminal 200 is a computer used by an individual, such as a personal computer, a smartphone, a mobile phone, a tablet computer, or a personal information terminal. The user terminal 200 includes a controller 201, a storage unit 202, a communication unit 203, and an input and output unit 204.

The controller 201 is an operation device that manages a control performed by the user terminal 200. The controller 201 can be realized by an operation processing device, such as a central processing unit (CPU).

The controller 201 executes a function of performing an interaction by accessing the contract server 100. The function may be realized by a web browser that runs on the user terminal 200 or dedicated application software.

The storage unit 202 includes a main storage device and an auxiliary storage device. The main storage device is a memory in which a program executed by the controller 201 and data used by the control program are expanded. The auxiliary storage device is a device in which a program executed by the controller 201 and data used by the control program are stored. The auxiliary storage device may store a packaged program executed by the controller 201 as an application. In addition, the auxiliary storage device may store an operating system for executing these applications. The program stored in the auxiliary storage device is loaded into the main storage device and executed by the controller 201, whereby the processing described below is performed.

The main storage device may include a random access memory (RAM) and a read only memory (ROM). In addition, the auxiliary storage device may include an erasable programmable ROM (EPROM) and a hard disk drive (HDD). Furthermore, the auxiliary storage device may include removable media, that is, portable recording media.

The communication unit 203 is a wireless communication interface for connecting the user terminal 200 to a network. The communication unit 203 is configured to communicate with the contract server 100 via, for example, a wireless local area network (LAN) or a mobile communication service based on 3rd generation (3G), long term evolution (LTE), or 5th generation (5G).

The input and output unit 204 is a unit that receives an input operation performed by a user and presents information to the user. In the present embodiment, the input and output unit 204 is formed of one touch panel display. That is, the input and output unit 204 is formed of a liquid crystal display and control means thereof, and a touch panel and control means thereof.

Next, the contract server 100 will be described.

The contract server 100 is a server device that makes conclusion of a sales contract for a vehicle based on a result of an interaction with the user terminal 200.

In the present embodiment, the contract server 100 may be configured to execute a Web server for performing an interaction with the user terminal 200. In this case, for example, the user terminal 200 can access the Web service using a browser, whereby a procedure for concluding the contract can be performed. The contract server 100 may provide a service by means other than the Web server. For example, the contract server 100 may execute a service that interacts with dedicated application software installed in the user terminal 200 by a predetermined protocol.

The contract server 100 can be configured by a general purpose computer. That is, the contract server 100 can be configured as a computer having a processor, such as a CPU or a graphic processor unit (GPU), a main storage device, such as RAM or ROM, and an auxiliary storage device, such as an EPROM, a hard disk drive, or removable media. An operating system (OS), various programs, and various tables are stored in the auxiliary storage device, and the programs stored therein are loaded into a work area of the main storage device and are executed. Through the execution of the programs, constituent parts and the like are controlled, so that each function that corresponds to a predetermined purpose can be realized as described below. Note that some or all of the functions may be realized by a hardware circuit, such as an ASIC or an FPGA.

The contract server 100 includes a controller 101, a storage unit 102, and a communication unit 103.

The controller 101 is an operation device that manages a control performed by the contract server 100. The controller 101 can be realized by an operation processing device, such as a CPU.

The controller 101 includes two functional modules, a specification decision unit 1011 and an ordering unit 1012. Each of the functional modules may be realized by executing a stored program by the CPU.

The specification decision unit 1011 decides the specifications of the vehicle to be bought and sold by performing an interaction with the user terminal 200 via the communication unit 103. The specification decision unit 1011 decides the following matters as the specifications of the vehicle. In the following description, a vehicle to be sold to a user is simply referred to as a "vehicle". In addition, the term "sales" includes sales on the assumption that a vehicle is sold after a predetermined period of time, such as sales by residual value setting credit or lease sales.

(1) Vehicle Model and Grade
(2) First Body Color
(3) Second Body Color
(4) Others (Options and the Like)

A first body color is a body color (first paint color) originally possessed by a vehicle. A second body color is a color of painting (second paint color) applied using an easily peelable paint.

In the vehicle ordering system according to the present embodiment, a vehicle having a predetermined body color (first body color) can be overcoated with a designated color (second body color) using an easily peelable paint.

The contract server 100 according to the present embodiment acquires whether or not a vehicle to be sold is planned to be sold within a predetermined number of years, and orders a vehicle using an easily peelable paint when the vehicle is planned to be sold within the predetermined number of years.

When the vehicle using the easily peelable paint is ordered, a user of the vehicle can use the vehicle having a desired body color for a predetermined period of time, and after the predetermined period of time elapses, the easily peelable paint can be peeled off and the body color can be restored to a body color having a high resale value.

For example, when a vehicle is purchased using residual value setting credit, the vehicle is sold after a predetermined number of years to repay an outstanding debt, so that such a method is effective.

When there is no plan to sell the vehicle after the predetermined number of years elapses (for example, when a user continues to own the vehicle), whether or not a user desires to use the easily peelable paint is confirmed, and when there is a desire, the vehicle using the easily peelable paint is ordered.

The ordering unit 1012 generates data (ordering instruction data) for instructing an order of a vehicle based on the specifications decided by the specification decision unit 1011, and transmits the data to an appropriate vehicle manufacturing base (facility). In addition, when the first body color and the second body color are different from each other, the ordering unit 1012 includes a painting instruction for the vehicle with the easily peelable paint in the ordering instruction data.

For example, when white is designated as the first body color and red is designated as the second body color, an instruction to the effect that "a vehicle having a white body color is overcoated with red at a predetermined painting base and shipped" is included in the ordering instruction data. In this case, the vehicle manufactured at the vehicle manufacturing base is overcoated with the second body color at a designated painting base. Therefore, a vehicle that conforms to the specifications is manufactured and a completed vehicle is shipped.

When the vehicle is a car in stock, data for designating an individual of the vehicle and data relating to the second body color may be transmitted to a stock management base (carpool) that manages the vehicle, in place of the ordering instruction data. In this case, the designated vehicle managed at the stock management base is overcoated with the designated second body color at the designated painting base, and the vehicle is shipped. A vehicle base 300 shown in FIG. 1 includes a vehicle manufacturing base, a stock management base, and a base for peeling off the easily peelable paint described below.

The storage unit 102 includes a main storage device and an auxiliary storage device. The main storage device is a memory in which a program executed by the controller 101 and data used by the control program are expanded. The auxiliary storage device is a device in which a program executed by the controller 101 and data used by the control program are stored.

The storage unit 102 stores specification data 102A, residual value data 102B, and order-related data 102C.

The specification data 102A is data for recording the specifications of a vehicle to be ordered, and is generated by the ordering unit 1012.

FIG. 3 is an example of the specification data 102A. As shown in FIG. 3, the specification data 102A includes an identifier (order ID) unique for each order of the vehicle, a user ID, a vehicle model ID, a grade ID, a first body color ID, a second body color ID, and information relating to other specifications (for example, options).

The residual value data 102B is data relating to a residual value of a vehicle for each body color. The residual value is an appraised value of a vehicle after a predetermined period of time elapses.

Here, the residual value of the vehicle will be described. An appraised value of a vehicle sold as a used car may vary depending on a vehicle model and age. Furthermore, even for the same vehicle model and age, the appraised value may vary depending on a color of a body.

In the vehicle ordering system according to the present embodiment, a vehicle can be overcoated with an easily peelable paint. Therefore, when the overcoating with the easily peelable paint is applied, the contract server 100 decides an original body color (first body color) of the vehicle based on a predicted residual value for each body color after a predetermined period of time elapses and the easily peelable paint is peeled off. As a result, it is possible to keep the appraised value of the vehicle higher after the easily peelable paint is peeled off.

FIG. 4 shows an example of the residual value data 102B. The residual value data 102B is data in which the residual value of the vehicle after a predetermined period of time elapses is described for each first body color. The residual value data includes a vehicle model ID and a grade ID, a first body color ID, a set date, and a set residual value, as shown in FIG. 4. The set residual value is a residual value guaranteed in advance by a business operator. The set residual value is a residual value of the vehicle after the set date arrives and the easily peelable paint is peeled off. The set residual value may be set based on a predicted appraised value in the used car market (predicted residual value).

In the illustrated example, when a vehicle having a vehicle model ID: V001 and a first body color ID: C001 is sold during a period from January to March 2024, the residual value is 1.5 million yen.

The residual value data 102B is updated as appropriate according to a market price of the used car market.

The storage unit 102 stores the order-related data 102C. The order-related data 102C is data relating to an order of a vehicle. FIG. 5 shows an example of the order-related data 102C. As shown in FIG. 5, the order-related data 102C includes a vehicle model ID, a grade ID, a first body color ID, a delivery date, and a vehicle manufacturing base that serves as an ordering destination. In FIG. 5, the delivery date A is a delivery date when the vehicle is delivered with the first body color as it is, and the delivery date B is a delivery date when the overcoating is applied with the easily peelable paint. The order-related data 102C is updated as appropriate according to a production status of the vehicle.

Each of the above-described kinds of data may be constructed by managing data stored in a storage device by a program of a database management system (DBMS) executed by a processor. In this case, each data can be, for example, a relational database.

The communication unit 103 is a communication interface for connecting the contract server 100 to a network. The communication unit 103 includes, for example, a network interface board and a wireless communication interface for wireless communication.

The configuration shown in FIG. 2 is an example, and all or a part of the illustrated functions may be executed using a circuit designed for exclusive use. In addition, the program may be stored or executed by a combination of a main storage device and an auxiliary storage device other than the methods disclosed.

Figure 6A:
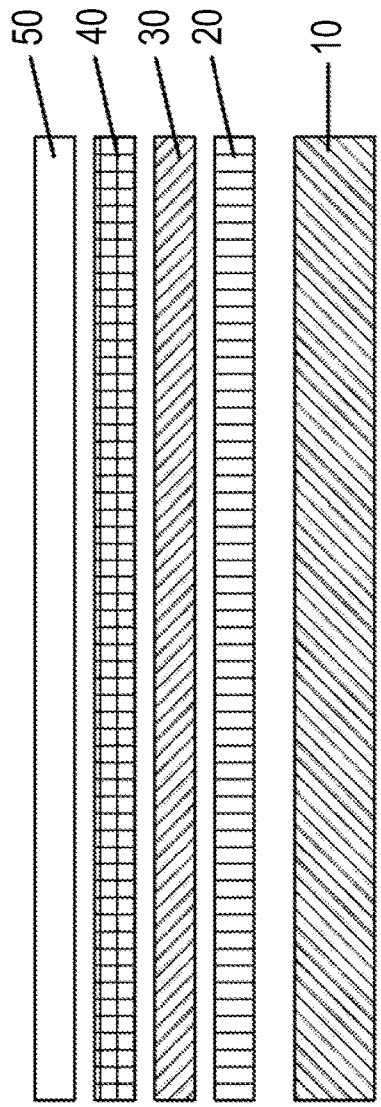
FIG. 6A is a schematic view of painting with an easily peelable paint.

Here, the easily peelable paint will be described. FIG. 6A is a schematic cross-sectional view showing a body member (for example, a steel plate) of a body and a coating film formed on the body member. As shown in FIG. 6A, the body member has a steel plate 10 on which an electrodeposition layer is formed by metal processing, and an intermediate coating layer 20, a base layer 30, and a clear layer 40 that are formed on the electrodeposition layer in order.

The base layer 30 is a layer that is a base for painting. The base layer 30 may be a pearl layer, a mica layer, or a glass flake layer.

Although the present example shows an example in which the base layer 30 is a single layer, the base layer 30 may have a coating film including two or more layers. When the base layer 30 has two layers, the coating film includes four layers, including the intermediate coating layer 20 and the clear layer 40.

In addition, the base layer 30 and the clear layer 40 may be provided again on the clear layer 40.

A coating film 50 is formed on an outer surface of the body member. The coating film 50 is a layer of a paint formed by applying an easily peelable paint, and has a property that the coating film can be peeled off easily by applying a force by a high-pressure car washing machine or a polishing device as compared with a normal coating film. The coating film 50 can be regarded as one example of the easily peelable layer of the present application and is peeled off more easily than the painting with the first body color consisting of one normal coating film or a plurality of normal coating films. The coating film 50 is formed by painting the body member with the easily peelable paint by, for example, a spraying method. Examples of the easily peelable paint include a paint formed of xylene, ethylbenzene, an antioxidant, methyl ethyl ketone, a silica reactant, titanium oxide (nanoparticles), and an organic solvent.

When it is desired to impart weather resistance, scratch resistance, and chipping resistance to the painting of the vehicle, the coating film 50 having each function may be applied.

The overcoating of the vehicle with the easily peelable paint can be applied at a predetermined base before the shipment of the vehicle. As a result, it is possible to easily change the body color of the vehicle (that is, change from the first body color to the second body color). The same applies to the peeling of the coating film 50. The coating film 50 is peeled off at a predetermined base, whereby the body color of the vehicle can be restored to the original (that is, the body color is restored from the second body color to the first body color). Since the original painting is protected by the coating film 50, a used car of which the painting of the body is not deteriorated can be obtained.

There is no need to apply painting with the coating film 50 on the entirety of the body member. For example, there is no need to provide the coating film 50 on a portion that is not exposed to an outside during traveling, such as an inside of an opening, such as a door.

In the present example, although the steel plate is exemplified as the body member, the body member may be a resin member. In this case, the intermediate coating layer 20 is a primer layer. A clear layer may be further provided on the coating film 50.

Figure 6B:
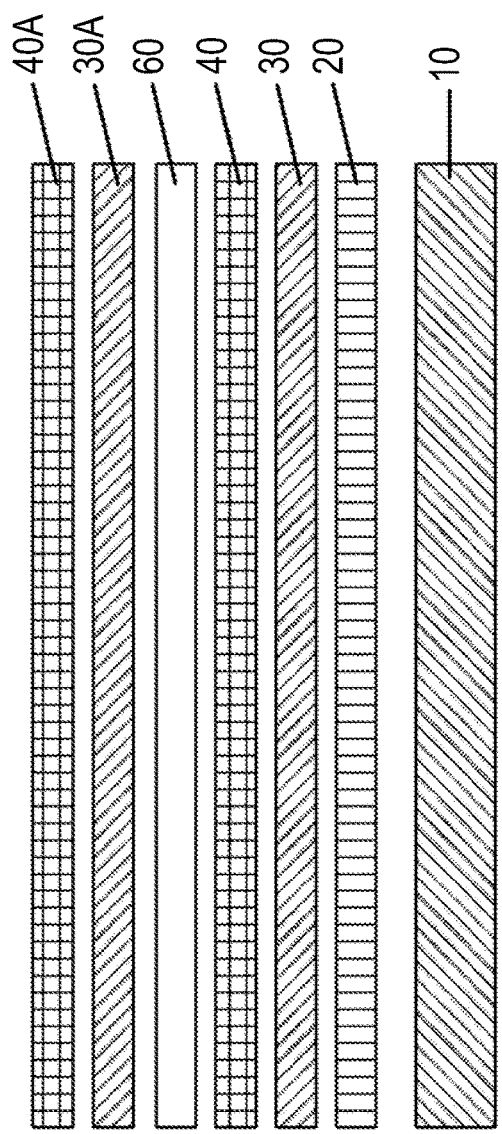
FIG. 6B is a schematic view of painting with an easily peelable paint.

In the example of FIG. 6A, although the paint itself is imparted with an easy peelability, normal painting may be applied on a layer having the easy peelability. For example, as shown in FIG. 6B, an easily peelable layer 60 that is not colored may be formed of the same material as the coating film 50, and a base layer 30A and a clear layer 40A may be formed on the easily peelable layer 60. The base layer 30A is a layer of paint having a color different from the color of the base layer 30. Even in the above-described configuration, the layer of the paint can be removed by peeling off the easily peelable layer 60. In the present specification, the easily peelable layer and the paint applied thereto are all referred to as an "easily peelable paint".

In the present example, although one color is exemplified as each of the first body color and the second body color, the first body color and the second body color may be formed of a plurality of colors. For example, a plurality of colors arranged in a predetermined pattern may be used as the first body color or the second body color. In addition, the term "color" or "body color" in the present specification may be represented by a plurality of layers of paint or material as well as a single-layer coating film. The layers may include, for example, a clear layer, a glass flake layer, a mica layer, and a pearl layer.

In addition, the overcoating with the second body color may be applied to at least a part of the painting with the first body color. That is, the overcoating with the second body color may not cover the entirety of the painting with the first body color. For example, when the first body color is black, a vehicle having two-tone colors of black and blue can be obtained by applying overcoating with blue to a part of the coating with the first body color.

Returning to the description of the contract server 100.

Figure 7:
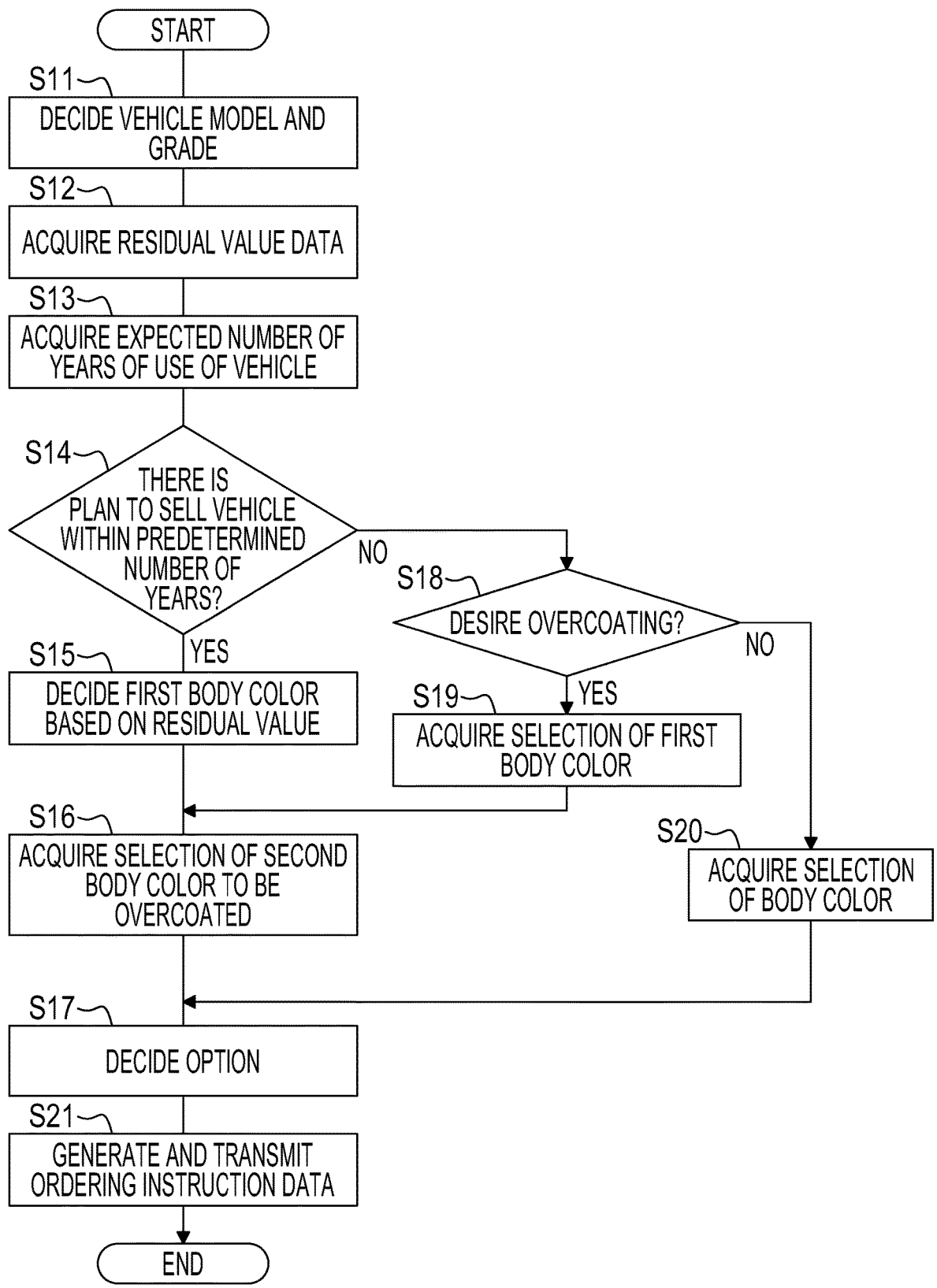
FIG. 7 is a flowchart of processing executed by the contract server.

FIG. 7 is a flowchart showing processing executed by the contract server 100. The processing shown in FIG. 7 is started, for example, at a timing when the user logs in to the contract server 100. At a timing when the processing is started, the contract server 100 assumes that the identification of the user is completed.

The processing of Steps S11 to S20 is executed by the specification decision unit 1011.

In Step S11, a vehicle model and a grade are decided. In the present step, a vehicle model and a grade desired by a user are selected from combinations of a plurality of preset vehicle models and grades.

Figure 8:
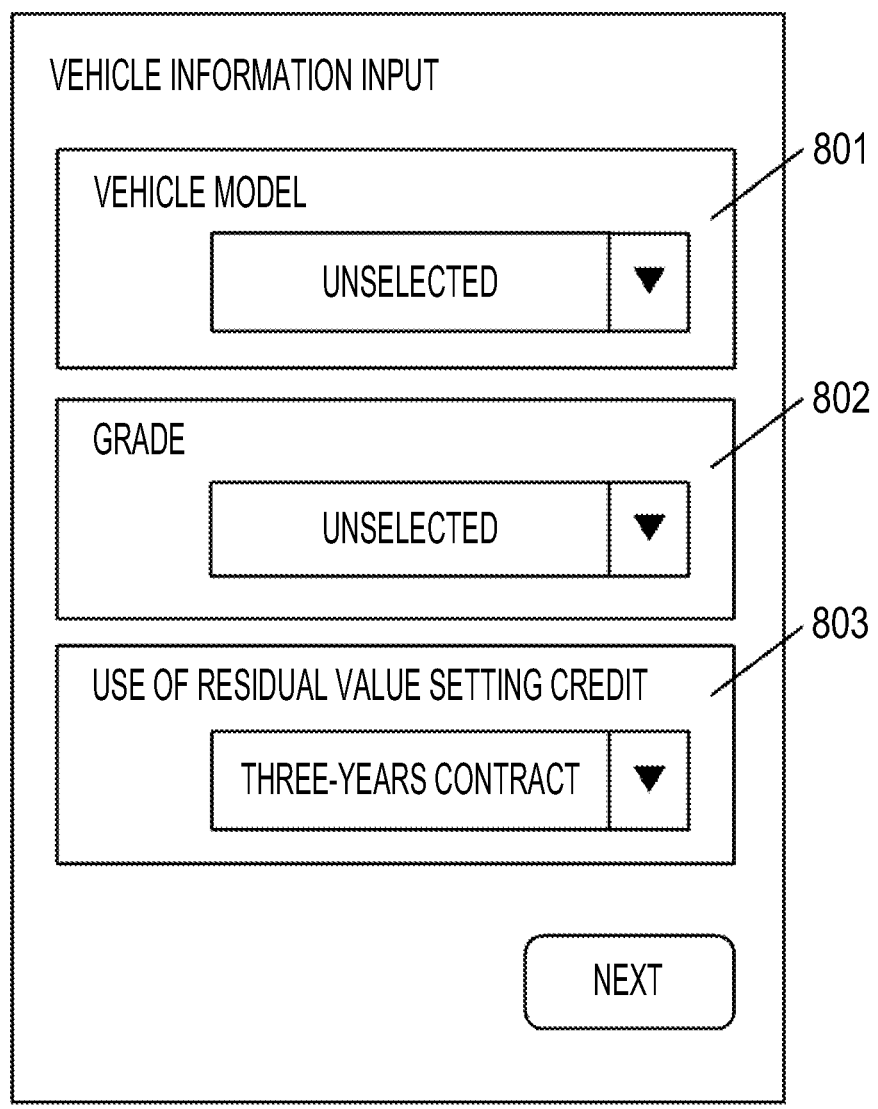
FIG. 8 is an example of a screen for acquiring information about a contract.

The selection may be made by the user, for example, via a screen as shown in FIG. 8. In the example of FIG. 8, reference numeral 801 denotes a GUI component for selecting a vehicle model. Reference numeral 802 denotes a GUI component for selecting a grade.

In Step S12, the residual value data 102B stored in the storage unit 102 is acquired.

In Step S13, an expected number of years of use of a vehicle is acquired. In the present embodiment, the user is made to select whether or not to use a contract of residual value setting credit, and when the user desires to use the contract, the number of years of the contract is set as the expected number of years of use of the vehicle. In the example of FIG. 8, reference numeral 803 denotes a GUI component for acquiring the expected number of years of use of the vehicle.

In the present example, although the user is made to select whether or not to use the contract of residual value setting credit, other information may be used to acquire the expected number of years of use of the vehicle. For example, the user may be made to select whether the sales form is a buy-out or a lease, and when the sales form is a lease, the number of years of the contract may be acquired. In addition, when the sales form is a buy-out, whether there is a plan to sell the vehicle in the future may be confirmed.

Next, in Step S14, determination is made whether or not there is a plan to sell the vehicle within a predetermined number of years (for example, three years). For example, in Step S13, when the user selects residual value setting credit (three-years contract), determination is made that there is a plan to sell the vehicle after three years. In addition, for example, in Step S13, when the user selects a lease and the number of years of the contract is three, determination is made that there is a plan to sell the vehicle after three years. When there is a plan to sell the vehicle within a predetermined number of years, the contract server 100 decides that the vehicle is overcoated with an easily peelable paint (Step S14—Yes).

That is, in Step S14, when the expected number of years of use of the vehicle is substantially within a predetermined number of years, the contract server 100 decides that the vehicle is overcoated with the easily peelable paint.

In Step S15, the body color of the vehicle (first body color) is decided based on a residual value for each body color after a predetermined period of time elapses. The first body color is decided by the contract server 100 based on a predetermined standard. For example, the following can be adopted as the predetermined standard.

(1) Among a plurality of body colors, a body color of the vehicle of which a residual value is highest is decided as the first body color.

(2) Any of body colors of the vehicle of which a residual value is higher than a predetermined value is decided as the first body color.

The standard used is decided by the intention of a person who has a plan to sell the vehicle in the future (for example, a leasing company that has ownership of the vehicle).

The predetermined value can be a value based on a new car price of the corresponding vehicle model. For example, a color of the vehicle of which a residual value after three years is higher than 65% of the new car price can be used as the first body color.

In general, the body color of the vehicle of which a residual value is high is determined by popularity of the color in the used car market. For example, the body color including a pearl layer or a pearl mica layer is more popular than other body colors and tends to have a higher residual value. Therefore, the color selectable as the first body color is more limited than the color selectable as the second body color. The first body color is selected from a first category described below.

Figure 9:
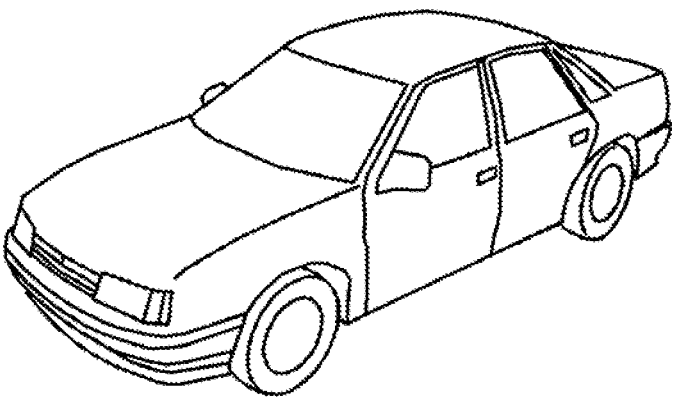
FIG. 9 is an example of a screen for acquiring information about a contract.

Next, in Step S16, the selection of the paint color (second body color) to be overcoated on the painting with the first body color is acquired. In the present step, a plurality of preset second body colors is presented to the user, and the user is made to select a desired color. FIG. 9 is an example of a screen for allowing the user to select the second body color.

On the other hand, when determination is made in Step S14 that there is no plan to sell the vehicle within a predetermined number of years, the processing transitions to Step S18. That is, in Step S14, when the expected number of years of use of the vehicle substantially exceeds a predetermined number of years, the processing transitions to Step S18. The case in which there is no need to sell the vehicle within a predetermined number of years refers to, for example, a case in which the user purchases the vehicle without using residual value setting credit (or lease).

Figure 10A:
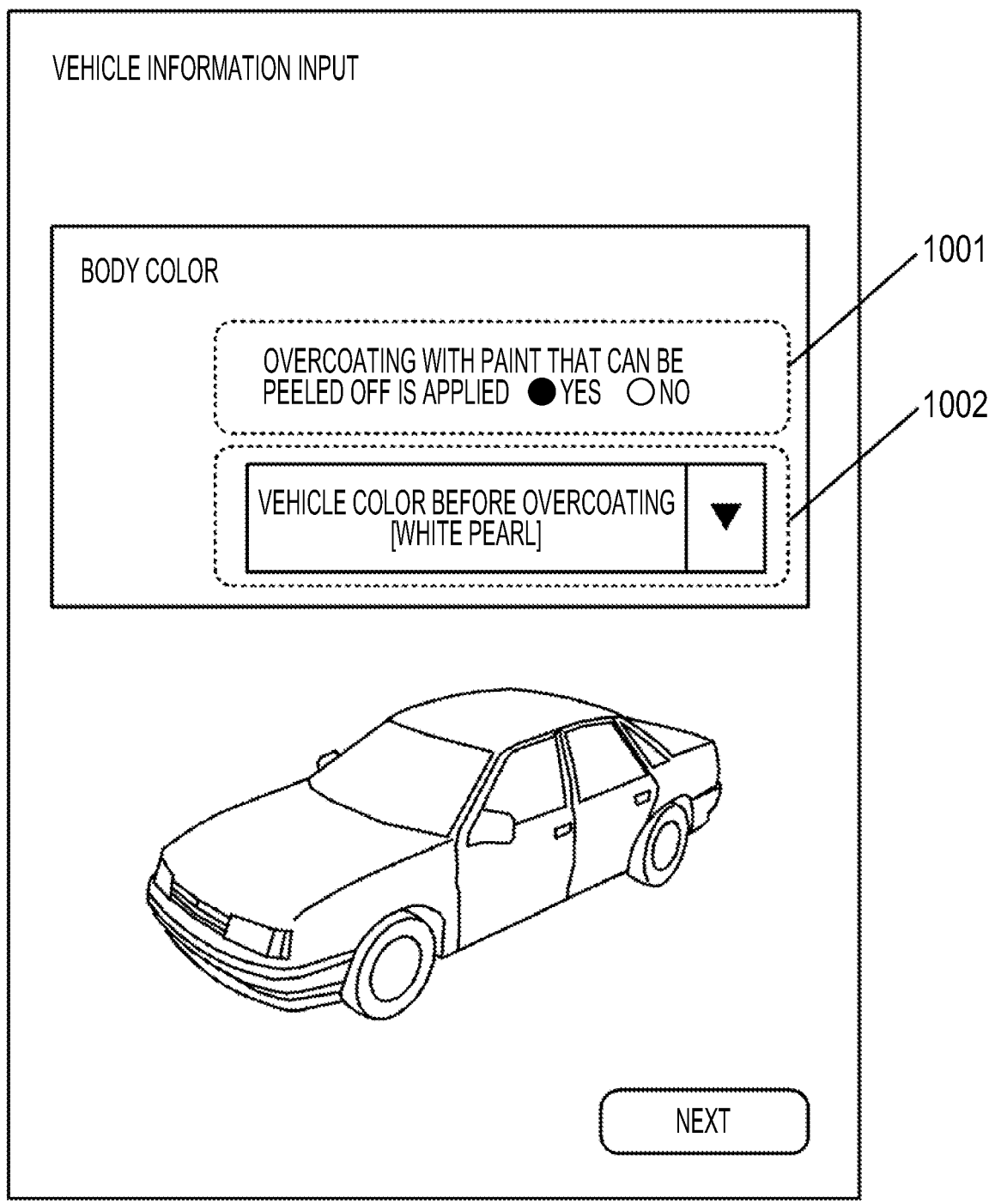
FIG. 10A is an example of a screen for acquiring information about a contract.

In Step S18, an inquiry is made about whether or not the user desires the overcoating with the easily peelable paint, and when the user desires the overcoating, the first body color is acquired in Step S19. In the present step, for example, a screen as shown in FIG. 10A is presented, and the user is made to select the first body color. According to the designation of the user, the specification decision unit 1011 decides the first body color. In the example of FIG. 10A, reference numeral 1001 denotes a GUI component for selecting whether or not the overcoating is desired. Reference numeral 1002 denotes a GUI component for selecting the first body color.

In the present step, the merits and demerits of the overcoating may be described to the user.

In addition, in the present step, a predicted appraised value of the vehicle after a predetermined period of time elapses may be presented. FIG. 10B is an example of a screen for guiding the predicted appraised value of the vehicle after a predetermined period of time (for example, three years) elapses. The predicted appraised value can be acquired based on the residual value data 102B.

In addition, when a useful life of the easily peelable paint is shorter than the expected number of years of use of the vehicle, the user may be notified of the useful life of the paint (for example, a quality of the easily peelable paint is guaranteed solely for a predetermined number of years), and when the user agrees with the matter, the processing may proceed to Step S19.

When the selection of the first body color is completed, the processing transitions to Step S16, and the selection of the second body color is performed.

When the user does not desire the overcoating in Step S18, the processing transitions to Step S20 to acquire the selection of the body color (first body color).

In Step S17, options and the like attached to the vehicle are selected. In the present step, for example, the selection of a manufacturer option, such as a safety device, or a dealer option, such as an in-vehicle terminal, is received.

When the specifications of the vehicle are decided, the specification data is generated and stored according to the decided specifications.

In Step S21, the ordering unit 1012 generates ordering instruction data based on the generated specification data, and transmits, via the communication unit 103, the ordering instruction data to a vehicle manufacturing base that serves as an ordering destination of the vehicle. FIG. 11 is a flowchart showing in detail processing executed by the ordering unit 1012 in Step S21.

First, in Step S31, the vehicle manufacturing base that serves as the ordering destination of the vehicle is decided. In the present step, for example, the vehicle manufacturing base that serves as the ordering destination is decided with reference to the order-related data 102C.

In Step S32, determination is made whether or not the overcoating is needed. The case in which the overcoating is needed refers to, for example, a case in which the first body color and the second body color are different from each other. When the overcoating is needed, the processing transitions to Step S33.

In Step S33, a category of the second body color is determined.

Here, a first category and a second category are exemplified as the category of the second body color. The first category is a body color with which the painting is possible at a base belonging to a vehicle manufacturer (hereinafter, referred to as a first painting base). The body color belonging to the first category is, for example, a genuine color adopted by the vehicle manufacturer. The first painting base may be a facility that manufactures the vehicle.

The second category is a body color to be painted at a base other than the first painting base (hereinafter referred to as the second painting base). The body color belonging to the second category is, for example, a color other than the genuine color adopted by the vehicle manufacturer.

When the category of the second body color is the first category, the processing transitions to Step S34, to generate ordering instruction data including an instruction to perform the overcoating at the first painting base and transmit the ordering instruction data to the vehicle manufacturing base that manufactures the vehicle. When the category of the second body color is the second category, the processing transitions to Step S35, to generate ordering instruction data including an instruction to perform the overcoating at the second painting base and transmit the ordering instruction data to the vehicle manufacturing base that manufactures the vehicle.

The ordering instruction data includes the designation of the painting base for the overcoating, as well as the specifications of the vehicle (including the first body color and the second body color). The vehicle manufacturing base that receives the ordering instruction data manufactures the vehicle according to the specifications, and the vehicle is overcoated at the designated painting base.

Here, although the first category and the second category are exemplified as the category of the body color, the category of the body color may be other than the first category and the second category, or may be three or more types. The second category includes more color variations than the first category. Similarly, the number of the painting bases for the overcoating is not limited to two types. The painting base may be, for example, a dealership, a service center, a sheet metal painting center, or an in-house facility. In addition, the painting base may be beyond the framework of the vehicle manufacturer.

When determination is made in Step S32 that the overcoating is not needed, the processing transitions to Step S36, to generate ordering instruction data and transmit the ordering instruction data to the vehicle manufacturing base that manufactures the vehicle.

In Step S21, the delivery date of the vehicle may be determined when the vehicle having the decided first body color is overcoated with the decided second body color. For example, the ordering unit 1012 may determine a delivery date of a requested vehicle based on the order-related data 102C, and present the delivery date to the user. At a timing when the transmission of the ordering instruction data is completed, the contract server 100 may notify the user that the order of the vehicle is completed.

The vehicle manufacturing base that has received the ordering instruction data manufactures a vehicle having the first body color (in other words, a vehicle having the first body color written on a caution plate), paints the vehicle with the second body color as needed, and delivers the vehicle to the user. The painting with the second body color can be performed at the designated first painting base or second painting base. When the vehicle manufacturing base that manufactures the vehicle and the painting base are different from each other, the vehicle may be deadheaded.

Although an example of newly manufacturing a vehicle is described here, the vehicle delivered to the user may be a car in stock. In this case, instead of the ordering instruction data, data designating an individual of the car in stock and an instruction to apply the overcoating to the car in stock at a predetermined painting base may be transmitted to a base (stock management base) that manages the stock of the vehicle. For example, the stock management base applies the overcoating to the designated vehicle at the designated painting base and delivers the vehicle to the user.

Next, a case in which the vehicle used by the user enters the vehicle base 300 will be described. Here, the vehicle base 300 refers to a base where the easily peelable paint is peeled off. The entrance of the vehicle into the vehicle base 300 occurs in the following cases.

Figure 12:
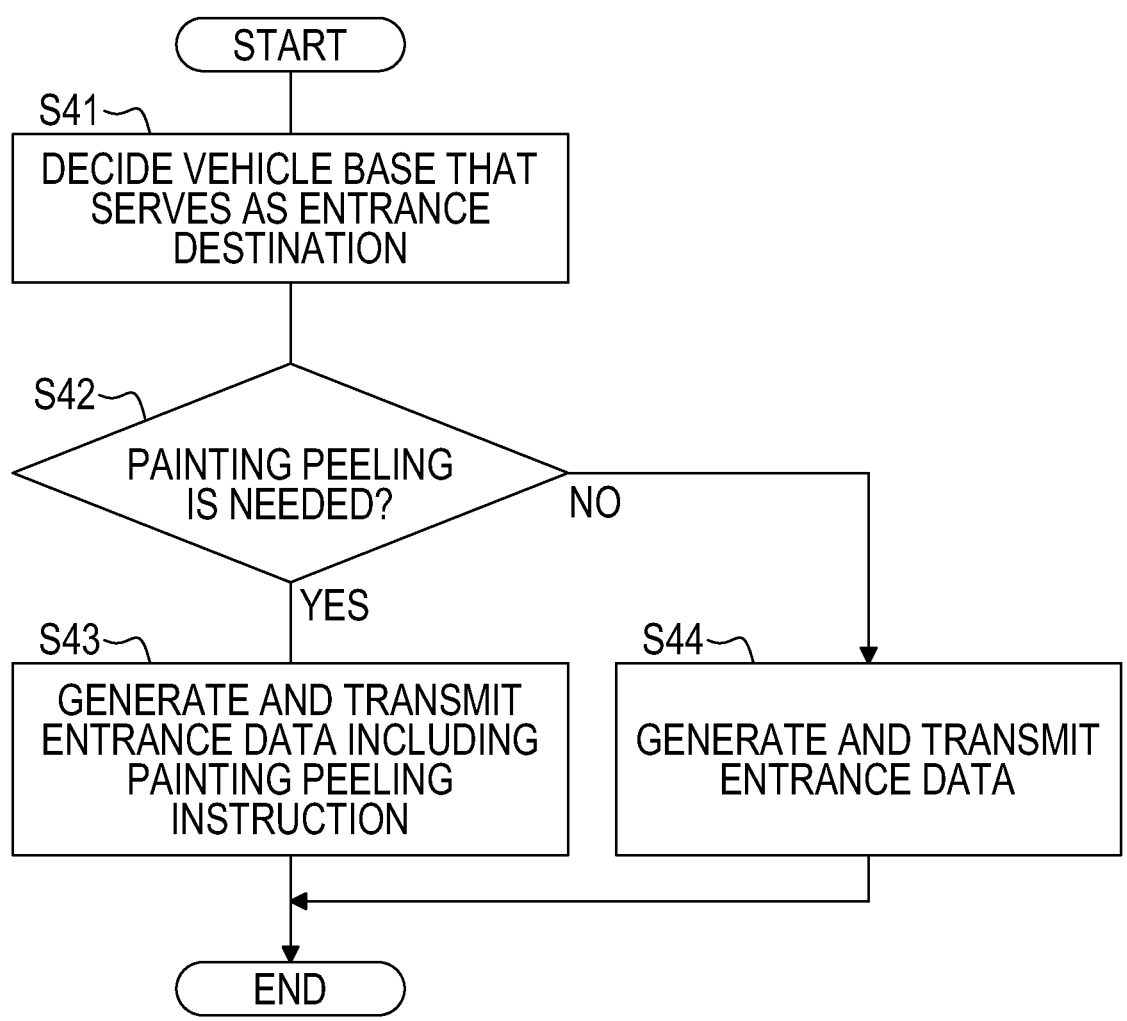
FIG. 12 is a flowchart of processing executed by the contract server at the time of entrance of a vehicle.

(1) A case in which a contract period with residual value setting credit is expired and the vehicle is returned
(2) A case in which a lease period of the vehicle is expired and the vehicle is returned (3) A case in which the user purchases the vehicle and the user desires to peel off the painting FIG. 12 is a flowchart of processing executed by the contract server 100 (controller 101) at the time of entrance of the vehicle. The processing is executed when any of the above-described cases occurs.

First, in Step S41, the vehicle base 300 in which the vehicle enters is decided.

In Step S42, determination is made whether or not the easily peelable paint needs to be peeled off from the vehicle. For example, when the overcoating is applied to the vehicle at the time of delivery, determination is made that the painting needs to be peeled off.

When the painting needs to be peeled off, the processing transitions to Step S43, to generate entrance data including a painting peeling instruction. The entrance data is data for notifying the vehicle base 300 of the entrance of the vehicle, and includes a contract ID, a vehicle ID, and an expected entrance date and time. The vehicle base 300 that has received the entrance data receives the vehicle. In addition, when the entrance data includes a painting peeling instruction, the vehicle base 300 peels off the easily peelable paint overcoated on the vehicle.

When the painting does not need to be peeled off, the processing transitions to Step S44, to generate entrance data not including a painting peeling instruction. The generated entrance data is transmitted to the vehicle base 300 that serves as an entrance destination.

When the transmission of the entrance data is completed, the contract server 100 transmits a notification regarding the entrance to the user. The notification may include information about the date and time of the entrance. The vehicle base 300 receives the vehicle according to the entrance data, and as needed, the overcoated painting is peeled off.

As described above, in the vehicle ordering system according to the first embodiment, the contract server 100 decides a combination of the original body color of the vehicle and the color of the easily peelable paint to be overcoated, as needed. The overcoating with the easily peelable paint is applied, whereby it is possible to keep the appraised value of the vehicle high after a predetermined period of time elapses.

Since the easily peelable paint has a useful life, even when the vehicle does not need to be returned, such as when the user buys out the vehicle, it is desired to guide the user about the useful life of the paint when the painting with the easily peelable paint is applied to the vehicle. For example, the contract server 100 may notify the user terminal 200 of the fact before the useful life of the paint is ended. The notification may include guidance on a peeling service of the painting.

Second Embodiment

In the first embodiment, in Step S13, an expected number of years of use of the vehicle is acquired based on a report from the user. On the other hand, when there is a history in which the user used another vehicle in the past, an expected number of years of use of a new vehicle may be estimated using the history.

In the present embodiment, the contract server 100 (storage unit 102) stores the past vehicle use history (hereinafter, referred to as history data) by the user. The history data may be a purchase history of the vehicle by the user in the past, or may be a history of the vehicle lease contract concluded by the user in the past. FIG. 13 is an example of the history data. The history data includes, for example, a user ID, a vehicle model ID, a grade ID, a first body color ID, a second body color ID, a purchase type, a use start date, and a use end date. The use start date is, for example, a date when the lease contract is started or the date when the vehicle is delivered. In addition, the use end date is, for example, a date when the lease contract ends or the date when the vehicle is sold. The history data is updated as appropriate by the contract server 100.

In the present embodiment, in Step S13, the contract server 100 acquires a change interval of the vehicle in the part by the user based on the history data, and estimates an expected number of years of use of a new vehicle based on this interval. The expected number of years of use of the new vehicle can be estimated based on, for example, the average value, the median value, the maximum value, or the minimum value of the change intervals of the vehicle in the past. A result of the estimation may be presented to the user for correction. As a result, the contract server 100 acquires the expected number of years of use of the new vehicle. The processing after Step S14 is the same as the processing of the first embodiment.

MODIFICATION EXAMPLE

The above embodiment is merely an example, and the present disclosure may be implemented with appropriate modifications without departing from the gist thereof.

For example, the processing and means described in the present disclosure can be implemented in any combination as long as no technical inconsistencies arise.

In the description of the embodiment, a form of selling the vehicle to the user is illustrated, but the information processing device according to the present disclosure can also be applied to a form other than sales, such as leasing.

In the description of the embodiment, the first body color and the second body color are different colors, but both may be the same color. The easily peelable paint is used, whereby it is possible to obtain the effect of protecting the body color.

In addition, in the description of the embodiment, although the residual value of the vehicle is acquired based solely on the first body color, the residual value of the vehicle may be acquired based on a combination of the first body color and the second body color or based solely on the second body color. This is because, when the useful life of the easily peelable paint remains, the vehicle itself to which the overcoating is applied may have a value.

The processing described as being performed by one device may be executed by a plurality of devices in a shared manner. Alternatively, the processing described as being performed by different devices may be executed by one device. In a computer system, a hardware configuration (server configuration) for realizing each function can be flexibly changed.

The present disclosure can also be realized by supplying a computer program in which the functions described in the above embodiment are implemented to a computer, and reading and executing the program by one or more processors possessed by the computer. Such a computer program may be provided to the computer by a non-temporary computer-readable storage medium that can be connected to the computer's system bus, or may be provided to the computer via a network. The non-temporary computer-readable storage medium includes, for example, any type of disk, such as a magnetic disc (Floppy (Registered trademark) disc, hard disk drive (HDD), or the like), or an optical disc (compact disc-read only memory (CD-ROM), digital video disc (DVD), blu-ray disc, or the like), a read-only memory (ROM), a random access memory (RAM), EPROM, EEPROM, a magnetic card, a flash memory, an optical card, and any type of media suitable for storing electronic instructions.

What is claimed is:

1. A vehicle manufacturing method comprising:
   receiving a first designation of a first paint color that is a vehicle color of a vehicle;
   deciding the first paint color based on the first designation;
   acquiring an expected number of years of use of the vehicle by a user;
   receiving a second designation of a second paint color that is an overcoat color, when the expected number of years of use is equal to or less than a predetermined value; and
   overcoating at least a portion of the vehicle painted with the first paint color, with a peelable layer with the second paint color.

2. The vehicle manufacturing method according to claim 1, wherein the portion of the vehicle that is overcoated with the peelable layer with the second paint color is exposed to an outside during traveling of the vehicle.

3. The vehicle manufacturing method according to claim 1, wherein:
   the first paint color is selected from a first category; and
   the second paint color is selected from a second category comprising more color variations than the first category.

4. The vehicle manufacturing method according to claim 1, further comprising:
   notifying the user of a timing at which a useful life of the painting comprising the peelable layer is ended.

5. The vehicle manufacturing method according to claim 1, further comprising:
   acquiring the expected number of years of use based on a history of a vehicle previously used by the user.

6. The vehicle manufacturing method according to claim 1, further comprising:
   acquiring the expected number of years of use based on at least one of: a history of a vehicle previously owned by the user, or a period of a vehicle lease contract previously concluded by the user.

7. The vehicle manufacturing method according to claim 1, further comprising:
   acquiring, based on at least one of the first paint color or the second paint color, a predicted appraised value of the vehicle after a predetermined period elapses.

8. The vehicle manufacturing method according to claim 1, further comprising:
   acquiring, based on the first paint color, a predicted appraised value of the vehicle when the painting comprising the peelable layer is peeled off after a predetermined period elapses.

9. The vehicle manufacturing method according to claim 8, wherein the first paint color is selected from a first category, further comprising:
   outputting the predicted appraised value for each paint color in the first category.

10. The vehicle manufacturing method according to claim 8, further comprising:
    deciding as the first paint color, a paint color of the vehicle of which the predicted appraised value is higher than a predetermined appraised value.

11. The vehicle manufacturing method according to claim 10, wherein the painting with the first paint color comprises a pearl layer or a pearl mica layer.

12. The vehicle manufacturing method according to claim 10, wherein the painting with the first paint color comprises a coating film comprising four or more layers.

13. The vehicle manufacturing method according to claim 1, further comprising:
    ordering the vehicle of which the first paint color is indicated on a caution plate.

14. The vehicle manufacturing method according to claim 1, wherein a subject that determines a standard for deciding the first paint color is different from a subject that designates the second paint color.

15. The vehicle manufacturing method according to claim 1, wherein a smaller area of the vehicle is to be painted with the second paint color than with the first paint color.

* * * * *